(12) United States Patent
Gu et al.

(10) Patent No.: US 11,493,338 B2
(45) Date of Patent: Nov. 8, 2022

(54) TILT DETECTION APPARATUS AND METHOD THEREOF

(71) Applicant: ABB Schweiz AG, Baden (CH)

(72) Inventors: Hao Gu, Shanghai (CN); Jihuan Tian, Shanghai (CN); Cheng Li, Shanghai (CN); Martin Kefer, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 1059 days.

(21) Appl. No.: 16/161,214

(22) Filed: Oct. 16, 2018

(65) Prior Publication Data
US 2019/0049244 A1    Feb. 14, 2019

Related U.S. Application Data

(63) Continuation of application No. PCT/CN2016/079643, filed on Apr. 19, 2016.

(51) Int. Cl.
*G01C 9/06* (2006.01)
*G01B 11/26* (2006.01)
*G01D 5/30* (2006.01)

(52) U.S. Cl.
CPC ............ *G01C 9/06* (2013.01); *G01B 11/26* (2013.01); *G01D 5/30* (2013.01); *G01C 2009/066* (2013.01)

(58) Field of Classification Search
CPC . G01B 11/26; G01D 5/30; G01C 9/06; G01C 2009/066
See application file for complete search history.

(56) References Cited

U.S. PATENT DOCUMENTS

| 4,600,304 A * | 7/1986 | Kafri | G01B 11/26 356/138 |
|---|---|---|---|
| 4,738,532 A * | 4/1988 | Robertson | G01C 25/00 33/283 |

(Continued)

FOREIGN PATENT DOCUMENTS

| CN | 1167907 A | 12/1997 |
|---|---|---|
| CN | 1624421 A | 6/2005 |

(Continued)

OTHER PUBLICATIONS

State Intellectual Property Office of the P.R. China, International Search Report & Written Opinion issued in corresponding Application No. PCT/CN2016/079643, dated Jan. 20, 2017, 10 pp.

(Continued)

*Primary Examiner* — Sang H Nguyen
(74) *Attorney, Agent, or Firm* — Greenberg Traurig, LLP (57) ABSTRACT

An apparatus for detecting tilt of a fixture and method thereof. The apparatus includes a visible element having a pattern visibly distinguishable from its surrounding area; a part having a plane reflective surface being configured to be engaged with the fixture in alignment and being arranged to reflect light beams propagating directly from the visible element so as to produce a first virtual image of the visible element; an image capture device being disposed at same side of the visible element with respective to the part having a plane reflective surface and being configured to have a field of view covering the first virtual image and a second virtual image of the visible element produced by the part having a plane reflective surface, wherein the second virtual image was produced where the part having a plane reflective surface assumed a levelling orientation; and a controller being adapted for detecting tilt of the fixture using a deviation of the first virtual image from the second virtual image of the visible element in the field of view of the image (Continued)

capture device. By using the apparatus or method according to present invention, no optical means, such as lens, is used for converging the light beams projected by the visible element. It is thus possible to facilitate the assembly of the apparatus, miniaturize the apparatus and reduce costs thereof.

15 Claims, 5 Drawing Sheets

(56) References Cited

U.S. PATENT DOCUMENTS

| | | | |
|---|---|---|---|
| 4,780,865 A | | 10/1988 | Yamakawa |
| 5,666,202 A | * | 9/1997 | Kyrazis ............... B25J 9/1697 356/614 |
| 5,742,383 A | | 4/1998 | Jeon |
| 5,929,983 A | | 7/1999 | Lu |
| 5,995,215 A | | 11/1999 | Hayes |
| 6,404,715 B1 | | 6/2002 | Takishima et al. |
| 6,418,629 B1 | | 7/2002 | Oh |
| 2004/0218191 A1 | | 11/2004 | Farrell et al. |
| 2006/0170908 A1 | * | 8/2006 | Glimm ................ G01C 1/02 356/148 |
| 2007/0008550 A1 | * | 1/2007 | Tobiason ........ G01B 9/02097 356/510 |
| 2009/0021884 A1 | * | 1/2009 | Nakamura ......... B81B 3/0059 359/224.1 |
| 2014/0053421 A1 | * | 2/2014 | Fan .................... G01C 9/20 33/366.16 |
| 2014/0176938 A1 | | 6/2014 | Yang et al. |
| 2015/0062579 A1 | | 3/2015 | Ohtomo et al. |
| 2015/0261097 A1 | | 9/2015 | Mathijssen et al. |
| 2015/0292914 A1 | | 10/2015 | Shimizu |

FOREIGN PATENT DOCUMENTS

| | | |
|---|---|---|
| CN | 1673856 A | 9/2005 |
| CN | 102918353 A | 2/2013 |
| CN | 103267495 A | 8/2013 |
| CN | 103727894 A | 4/2014 |
| DE | 2614466 A1 | 10/1977 |
| DE | 2756457 A1 | 6/1979 |
| DE | 3931925 A1 | 4/1991 |
| DE | 102014002084 A1 | 4/2015 |
| EP | 0448362 A2 | 9/1991 |
| EP | 1355302 A2 | 10/2003 |
| EP | 1975555 A2 | 10/2008 |
| EP | 2816322 A1 | 12/2014 |
| FR | 2896579 A1 | 7/2007 |
| GB | 520339 A | 4/1940 |
| JP | S61112905 A | 5/1986 |
| JP | H03257307 A | 11/1991 |

OTHER PUBLICATIONS

"Autocollimator," Wikipedia, Retrieved from the Internet: http://en.wikipedia.org/w/index.php?title=Autocollimator&oldid=841852622.

European Pattent Office, European Search Report issued in corresponding European application No. 16898928.3, dated Nov. 19, 2019, 7 pp.

Chinese Patent Office, Search Report issued in corresponding Chinese application No. 2016800846953, dated Nov. 20, 2019, 5 pp.

Chinese Patent Office, First Office Action issued in corresponding Chinese application No. 2016800846953, dated Dec. 3, 2019, 7 pp.

European Examination Communication, pursuant to Article 94(3), EPC; issued by the European Patent Office, regarding corresponding patent application Serial No. EP16898928.3; dated Jul. 2, 2021; 7 pages.

\* cited by examiner

TILT DETECTION APPARATUS AND METHOD THEREOF

TECHNICAL FIELD

The invention relates to measuring arrangements by use of optical means, and more particularly to detecting tilt angle of a fixture by use of optical means.

BACKGROUND ART

In electronics production, it requires a relatively high geometry alignment accuracy for assembling small parts, such as sheet or ring-shaped ones. Robot assembly system has several advantages in handling small part assembly, for example higher production output rate, lower operating cost, better process quality, safer workplace and so on. A fixture is normally provided for holding the parts so that they can be disposed in desirable place and orientation.

A small levelling error of the fixture can cause final alignment error. For example, in assembling a 100 mm*100 mm sheet, levelling error at 1° causes 0.025 mm alignment error. Therefore, levelling measurement of the fixture is required in accurate assembly.

Autocollimator is an optical instrument for non-contact measurement of angles. It can be applied to measure the tilt of the fixture in the robot assembly system. The autocollimator projects parallel light beams. An external reflector reflects all or part of the beam back into the instrument where the beam is focused and detected by a photodetector. The autocollimator measures the deviation between the emitted beam and the reflected beam.

In the autocollimator, formation of the parallel light beams requires a lens diverging the incoming light beams from the light source and formation of the focus of the reflected light beams requires the lens converging the incoming light beams from the external reflector. As a characteristics of detection is influenced by positions and the like of the configured photodetector, the light source and the lens, positioning thereof requires relatively high accuracy and manufacturing involves considerable difficulties. Furthermore, since the light beams emitted from the light source are converged by the lens before they reach the reflector, the incident area of the reflector becomes relatively narrow. Under a worse situation where the reflector would be disposed outside of the incident area as defined by the lens, the autocollimator will not work.

BRIEF SUMMARY OF THE INVENTION

According to an aspect of present invention, it provides an apparatus for detecting tilt of a fixture, including: a visible element having a pattern visibly distinguishable from its surrounding area; a part having a plane reflective surface being configured to be engaged with the fixture in alignment and being arranged to reflect light beams propagating directly from the visible element so as to produce a first virtual image of the visible element; an image capture device being disposed at same side of the visible element with respective to the part having a plane reflective surface and being configured to have a field of view covering the first virtual image and a second virtual image of the visible element produced by the part having a plane reflective surface, wherein the second virtual image was produced where the part having a plane reflective surface assumed a levelling orientation; and a controller being adapted for detecting tilt of the fixture using a deviation of the first virtual image from the second virtual image of the visible element in the field of view of the image capture device.

According to another aspect of present invention, it provides a method for detecting tilt of a fixture, including: a visible element projecting a pattern visibly distinguishable from its surrounding area; reflecting light beams propagating directly from the visible element so as to produce a first virtual image of the visible element by a part having a plane reflective surface engaged with the fixture in alignment; having a field of view of an image capture device to cover the first virtual image and a second virtual image of the visible element produced by the part having a plane reflective surface, wherein the second virtual image was produced where the part having a plane reflective surface assumed a levelling orientation; and detecting tilt of the fixture using a deviation of the first virtual image from the second virtual image of the visible element in the field of view of the image capture device.

By using the apparatus or method according to present invention, no optical means, such as lens, is used for converging the light beams projected by the visible element. It is thus possible to facilitate the assembly of the apparatus, miniaturize the apparatus and reduce costs thereof. Preferably, the visible element is a portion of the image capture device facing the part having a plane reflective surface. By reuse of a portion of the image capture device as the visible element, it thereby makes the apparatus more compact and reduce costs thereof.

Preferably, a lens of the image capture device and the visible element are disposed at substantially same distance from the part having a plane reflective surface where the fixture assumes the levelling orientation. In a situation where the distances are of large difference, such configuration is helpful for increasing the accuracy of the derivation between the first virtual image and the second virtual image and thus leads to better measurement results.

Preferably, a focal length of the image capture device is maintained twice as long as its distance to the part having a plane reflective surface assuming the levelling orientation. In such arrangement, the image capture device can obtain a relatively clear image of the pattern in the mirror without adjustment of the focus too much.

BRIEF DESCRIPTION OF THE DRAWINGS

The subject matter of the invention will be explained in more detail in the following text with reference to preferred exemplary embodiments which are illustrated in the drawings, in which.

PREFERRED EMBODIMENTS OF THE INVENTION

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well-known methods and programming procedures, devices, and circuits are omitted so not to obscure the description of the present invention with unnecessary detail.

Figure 1:
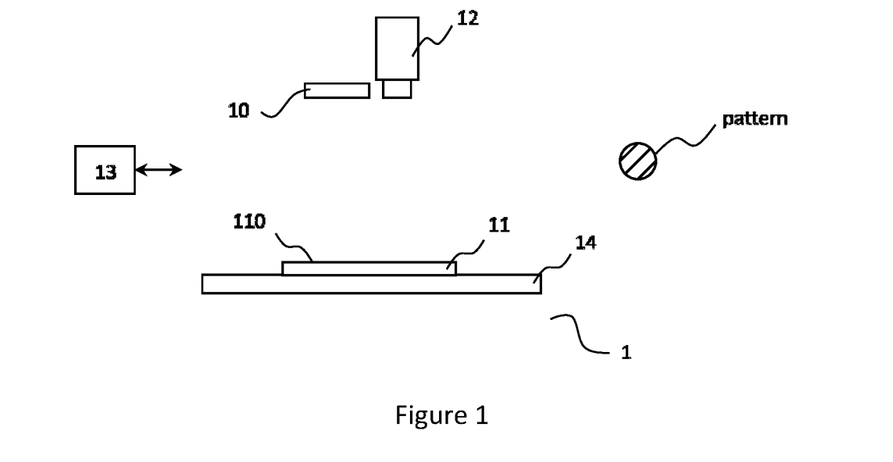
FIG. 1 shows an apparatus for detecting tilt of a fixture according to a first embodiment of present invention.

FIG. 1 shows an apparatus for detecting tilt of a fixture according to a first embodiment of present invention. As shown in FIG. 1, the apparatus 1 includes a visible element 10, a part having a plane reflective surface 11, an image capture device 12 and a controller 13.

The visible element 10 has a pattern visibly distinguishable from its surrounding area. The pattern can be special arrangement of shapes, colours, lines, and so on, which can be identified by image processing technology, for example image recognition, from the rest of the components fall in the field of view of the image capture device 12 of the apparatus 1. To the right of FIG. 1, the pattern view is presented as a multiple of parallel dashes in a circle. The visible element 10 can be a light source performing natural or artificial processes that diffuses light, for example, a screen displaying a pattern of chessboard or an LED. As an alternative, it does not illumine by itself, but exhibits characteristics of diffuse reflection. Thus, it is visible by diffuse reflection from their surface. In either of the two cases, the visible element 10 can be visually observed from various points of view.

The part having a plane reflective surface 11 is configured to be engaged with the fixture 14 in alignment and is arranged to reflect light beams propagating directly from the visible element 10 so as to produce a first virtual image of the visible element 10. For example, the part having a plane reflective surface 11 can be a plane mirror or a substrate being polished and coated with metal. Unlike curved mirrors produce magnified or diminished images or focus light or simply distort the reflected image, objects viewed in the part having a plane reflective surface 11 will appear laterally inverted (e.g., if one raises one's right hand, the image's left hand will appear to go up in the mirror), but not vertically inverted (in the image a person's head still appears above his body). However, the part 11 does not usually "swap" left and right any more than it swaps top and bottom. Such kind of part 11 typically reverses the forward/backward axis. To be precise, it reverses the object in the direction perpendicular to the plane reflective surface (the normal). Because left and right are defined relative to front-back and top-bottom, the "flipping" of front and back results in the perception of a left-right reversal in the image. For example, the part having a plane reflective surface 11 can be placed to stand on and held by the fixture 14. Because of the aligned engagement of the part having a plane reflective surface 11 and the fixture 14, a tilt of the fixture 14 has proportional/identical information on a tilt of the part having a plane reflective surface 11. Therefore, it is possible to arrive at the former by measuring the latter. The first virtual image of the visible element 10 results from reflection off of the screen 110 of the part having a plane reflective surface 11. The incoming light beams projected by the visible element 10 propagated in a homogeneous medium of air before arriving at the part having a plane reflective surface 11, rather travelling through any optical means, such as lens. The first virtual image I1 appears like a reflected duplication of the visible element 10 that looks almost identical, but is reversed in the direction perpendicular to the part having a plane reflective surface screen 110. Consequently, it can be observed that the pattern in the first virtual image looks almost identical with that of the visible element 10 as well, but with the observed reversal. As the pattern in the first virtual image and that of the visible element 10 are identical except for the orientation reversal, its distinctiveness keeps unchanged, and thus can still be visually distinguished from the images of the background of the visible element 10 which are produced by the part having a plane reflective surface 11.

The image capture device 12 is disposed at same side of the visible element 10 with respective to the part having a plane reflective surface 11 and is configured to have a field of view covering the first virtual image and a second virtual image of the visible element 10 produced by the part having a plane reflective surface 11, wherein the second virtual image was produced where the part having a plane reflective surface 11 assumed a levelling orientation. For example as shown in FIG. 1, both of the image capture device 12 and the visible element 10 are arranged above the part having a plane reflective surface 11. As an alternatively, they can be arranged below the part having a plane reflective surface 11. A memory of the apparatus can be configured for storing information concerning a location of the second virtual image of the visible element 10 in the field of view of the image capture device 12. The image capture device 12 has a field of view covering a part of the world that is visible through the image capture device 12, while views of articles outside of the field of view FOV is not. It is a solid angle through which the image capture device 12 is sensitive to light beams.

Figure 2A:
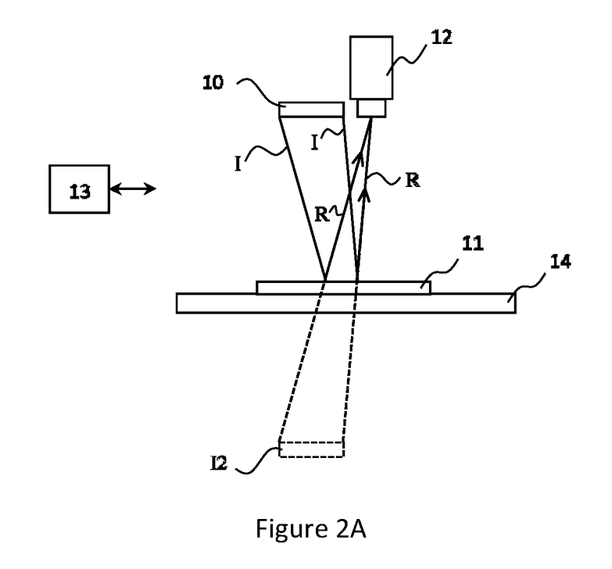
FIGS. 2A and 2B respectively show the part having a plane reflective surface (the fixture) is levelling positioned and the field of view of the image capture device.
Figure 2B:
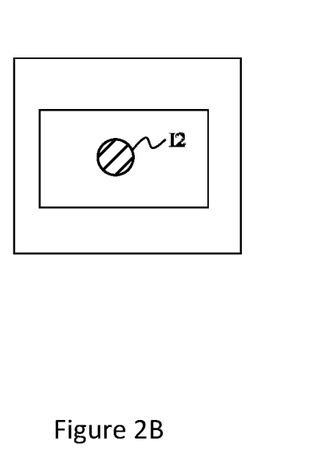

With the continue change of the tilt angle of the part having a plane reflective surface 11, the first virtual image I1 of the visible element 10 shifts in the field of view of the image capture device 12. For example, the tilt angle measurement range is defined between [−β, β]. FIGS. 2A and 2B respectively show the part having a plane reflective surface (the fixture) is levelling positioned and the field of view of the image capture device. The tilt angle amounts to 0 degree. As shown in FIG. 2A, the second virtual image I2 is produced by the part having a plane reflective surface 11, where the part having a plane reflective surface 11 assumes the levelling orientation. The second virtual image I2 results from the reflected light beam R in turn resulting from the refraction of the incident light beam I by the part having a plane reflective surface 11. This allows for the first virtual image I1 can be associated with a virtual location in space.

Figure 2C:
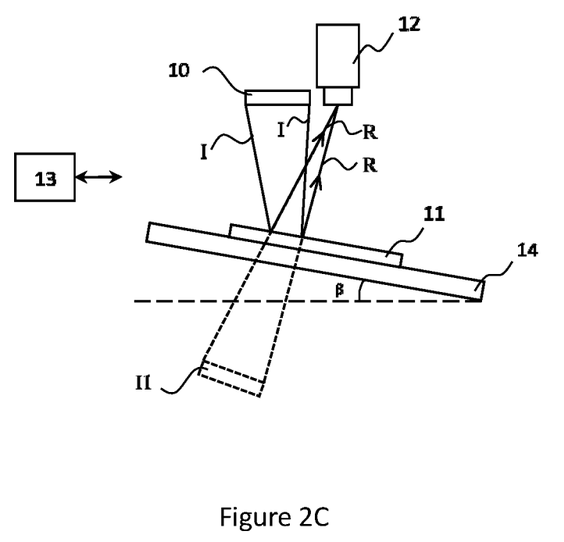
FIGS. 2C and 2D respectively show the part having a plane reflective surface (the fixture) tilt by angle β and the field of view of the image capture device.
Figure 2D:
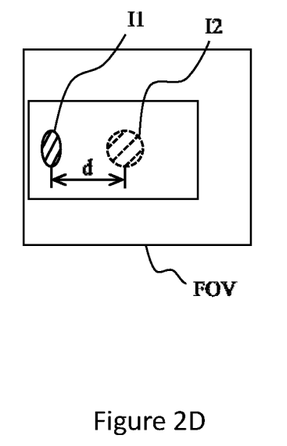
Figure 2E:
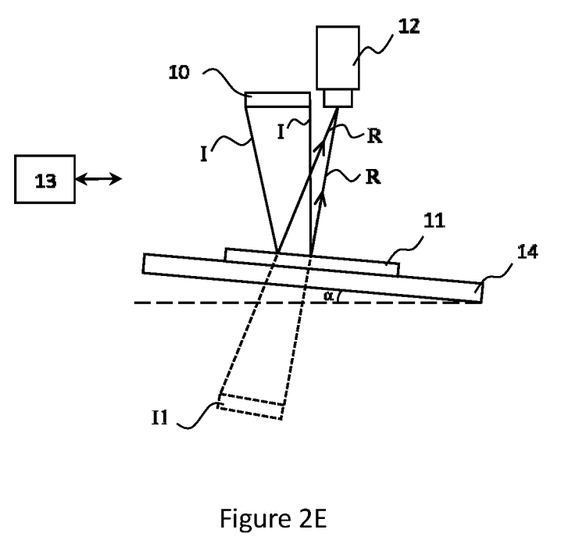
FIGS. 2E and 2F respectively show the part having a plane reflective surface (the fixture) tilts by angle α and the field of view of the image capture device.
Figure 2F:
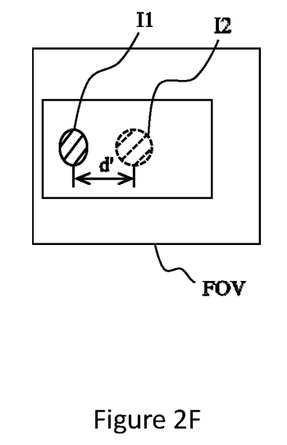
Figure 2G:
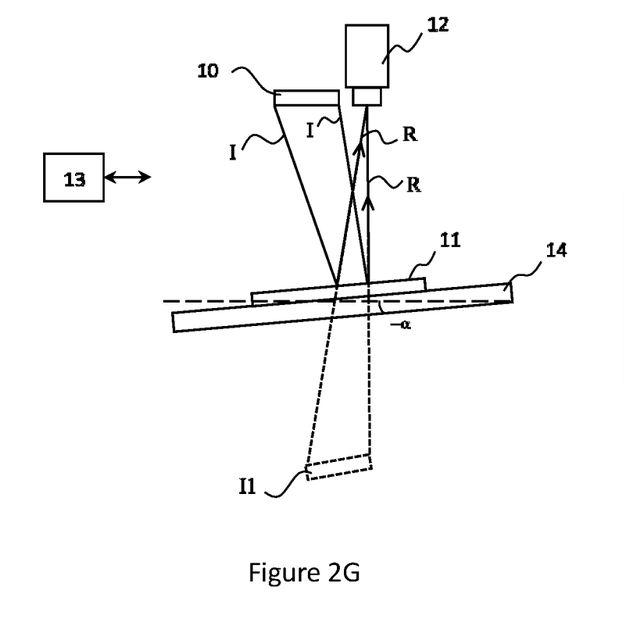
FIGS. 2G and 2H respectively show the part having a plane reflective surface (the fixture) tilt by angle −α and the field of view of the image capture device.
Figure 2H:
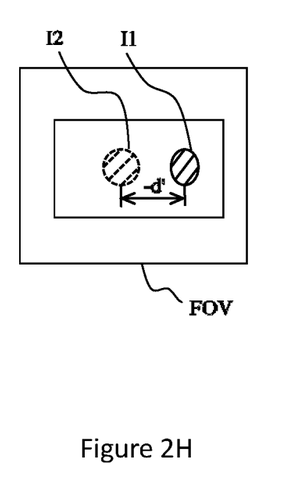
Figure 2I:
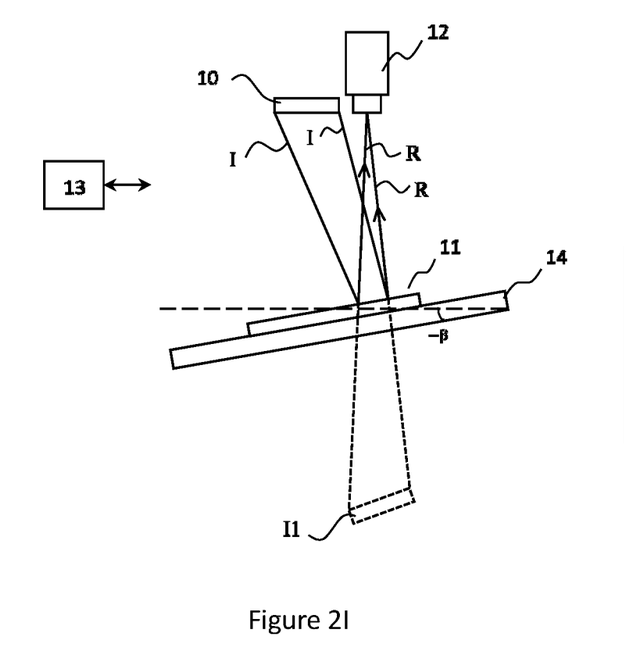
FIGS. 2I and 2J respectively show the part having a plane reflective surface (the fixture) tilt by angle −β and the field of view of the image capture device.
Figure 2J:
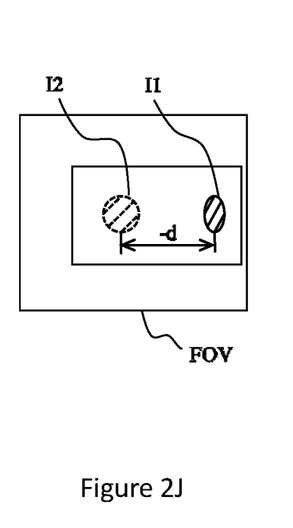

FIGS. 2C and 2D respectively show the part having a plane reflective surface (the fixture) tilt by angle β and the field of view of the image capture device. FIGS. 2E and 2F respectively show the part having a plane reflective surface (the fixture) tilts by angle α and the field of view of the image capture device. FIGS. 2G and 2H respectively show the part having a plane reflective surface (the fixture) tilt by angle −α and the field of view of the image capture device. FIGS. 2I and 2J respectively show the part having a plane reflective surface (the fixture) tilt by angle −β and the field of view of the image capture device. As shown in FIGS. 2C, 2E, 2G and 2I, the first virtual image I1 results from the reflected light beam R in turn resulting from the refraction of the incident light beam I by the part having a plane reflective surface 11. This allows for the first virtual image I1 can be associated with a virtual location in space, as well. It can been seen from FIGS. 2D, 2F, 2H and 2J, the second virtual image I2 shifts and keeps within the field of view FOV of the image capture device 12. In the situation as shown in the FIGS. 2D, 2F, 2H and 2J, because the second virtual image I2 which was formed by the part having a plane reflective surface 11 when it assumed horizontal orientation as discussed above and its location in the field of view FOV is remembered by a memory, the second virtual image I2 is indicated by a dashed circle. Besides, in the field of view FOV, the deviation of the second virtual image I2 from the first virtual image I1 is indicated by reference sign d, which is called FOV deviation hereafter. The distance between the image capture device 12 and the part having a plane reflective surface is a factor affecting if the extent of the field of view FOV of the image capture device 12 covers the first virtual image I1. Therefore, the extent of field of view can be broadened by elongating such distance, and vice versa.

The controller 13 is adapted for detecting tilt of the fixture 14 using a deviation of the first virtual image I1 from the second virtual image I2 of the visible element in the field of view FOV of the image capture device 12. As mentioned above, either of the first virtual image I1 and the second virtual image I2 has respective virtual location in space. The deviation D of the virtual locations of the first virtual image I1 and the second virtual image I2 can be calculated in consideration of the FOV deviation. The skilled person should understand that a standard procedure of camera calibration to obtain the scale factor between the FOV deviation and actual deviation D. For example, a calibration checkboard may be placed at the same height of the pattern 10, on which the edge length of the squares is known. The image of the checkboard in the mirror 11 is obtained by the image capture device 12, and by image processing algorithm, all the vertices of squares can be located and the differences between neighbouring vertices in pixel can be calculated. From the actual edge length of the squares in millimetre and the differences between neighbouring vertices in pixel, we can get the mm-px scale factor, and thus are able to calculate the actual deviation D based on the FOV deviation.

By using the Laws of Geometrical Optics, the tilt angle γ can be calculated as:

$$D = 2H^* \cos \gamma^* \sin \gamma \approx 2H^* \sin \gamma; \quad (1)$$

$$\gamma \approx a\sin(D/2H); \quad (2)$$

where H is the distance between the image capture device and the part having a plane reflective surface assuming the levelling orientation, D is the deviation of the virtual locations of the first virtual image I1 and the second virtual image I2.

In the tilt detection apparatus according to present invention, no optical means, such as lens, is used for converging the light beams projected by the visible element. It is thus possible to facilitate the assembly of the apparatus, miniaturize the apparatus and reduce costs thereof.

The lens of the image capture device 12 and the visible element 10 are preferably disposed at substantially same distance from the part having a plane reflective surface 11 where the fixture 14 assumes the levelling orientation. Such arrangement is helpful for better measurement accuracy. Otherwise, if the distances are of large difference, the derivation as a calculation result of equations (1) and (2) would be erroneous and lead to results with bad accuracy performance.

Preferably, a focal length of the image capture device 12 is maintained twice as long as its distance to the part having a plane reflective surface 11 assuming the levelling orientation. In such arrangement, the image capture device 12 can obtain a relatively clear image of the pattern in the mirror 13 without adjustment of the focus too much.

Figure 3:
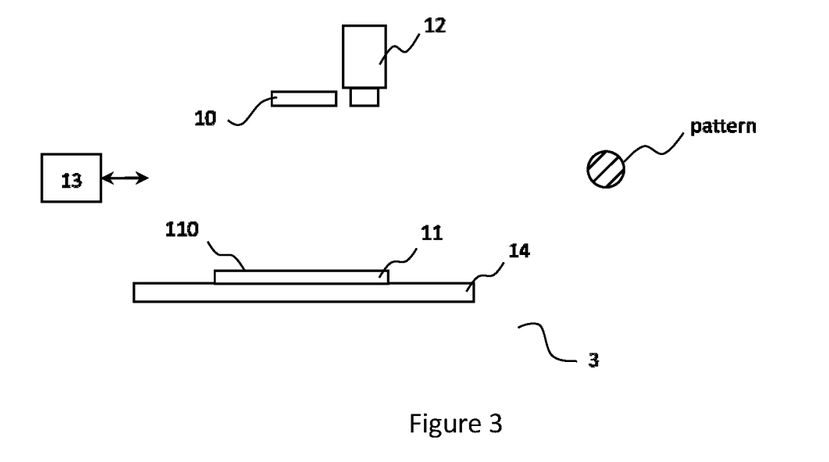
FIG. 3 shows an apparatus for detecting tilt of a fixture according to a second embodiment of present invention.
Figure 4A:
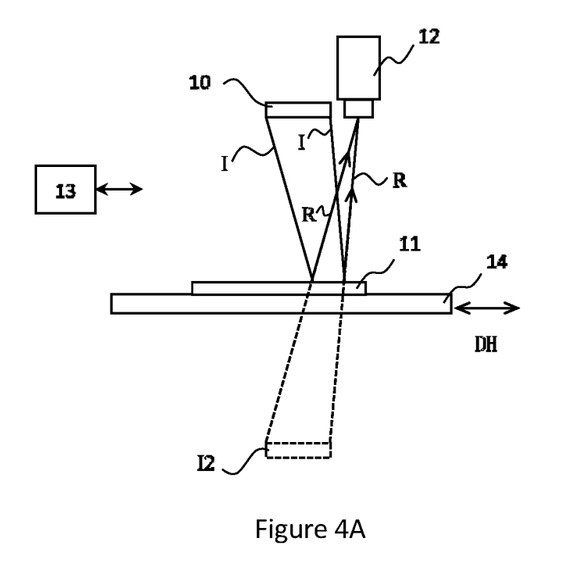
FIGS. 4A and 4B respectively show the part having a plane reflective surface (the fixture) is levelling positioned and the field of view of the image capture device.
Figure 4B:
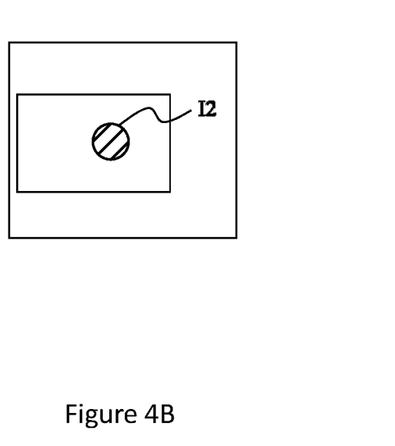
Figure 4C:
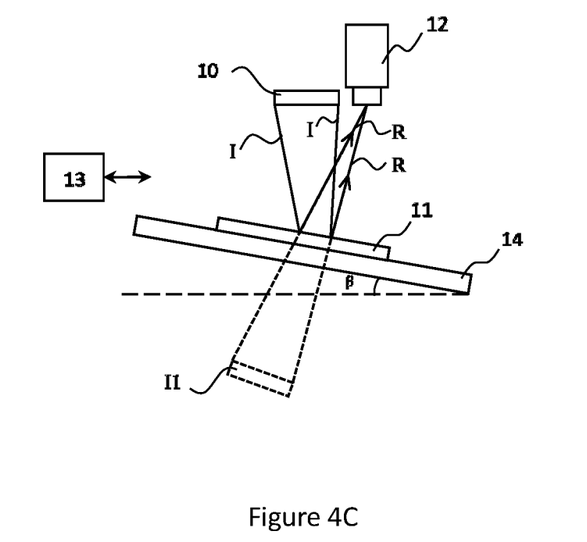
FIGS. 4C and 4D respectively show the part having a plane reflective surface (the fixture) tilt by angle β and the field of view of the image capture device.
Figure 4D:
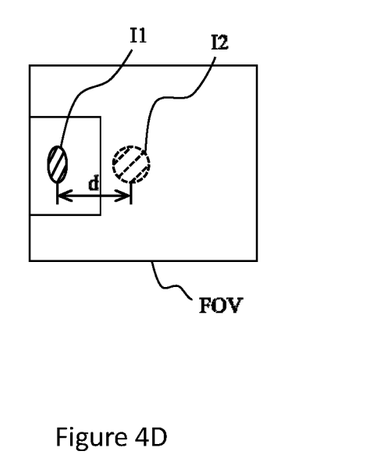
Figure 4E:
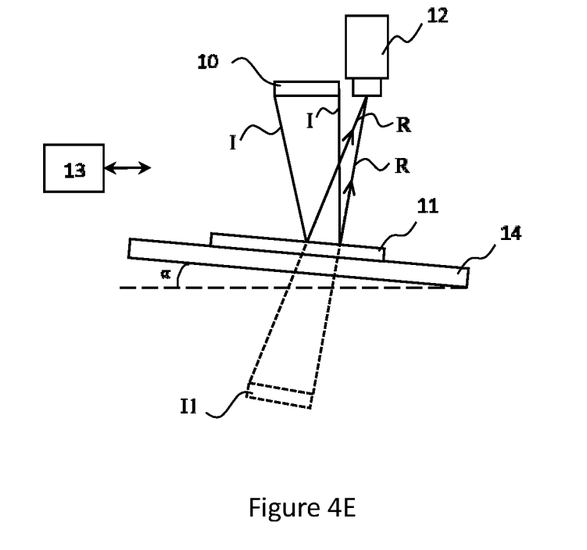
FIGS. 4E and 4F respectively show the part having a plane reflective surface (the fixture) tilts by angle α and the field of view of the image capture device The reference symbols used in the drawings, and their meanings, are listed in summary form in the list of reference symbols. In principle, identical parts are provided with the same reference symbols in the figures.
Figure 4F:
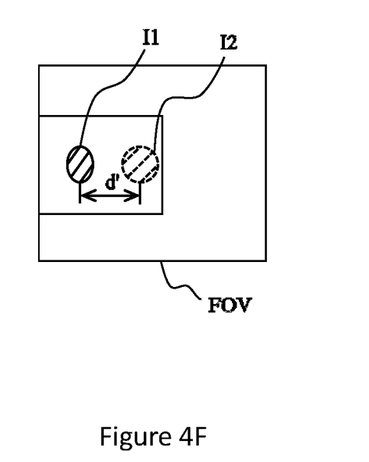

FIG. 3 shows an apparatus for detecting tilt of a fixture according to a second embodiment of present invention. The apparatus 3 according to FIG. 3 is similar to that according to FIG. 1 except that the part having a plane reflective surface 11 is shifted horizontally for a distance DH. FIGS. 4A and 4B respectively show the part having a plane reflective surface (the fixture) is levelling positioned and the field of view of the image capture device. The tilt angle amounts to 0 degree. As shown in FIG. 4A, the second virtual image I2 is produced by the part having a plane reflective surface 11, where the part having a plane reflective surface 11 assumes the levelling orientation. The second virtual image I2 results from the reflected light beam R in turn resulting from the refraction of the incident light beam I by the part having a plane reflective surface 11. This allows for the second virtual image I2 can be associated with a virtual location in space. FIGS. 4C and 4D respectively show the part having a plane reflective surface (the fixture) tilt by angle β and the field of view of the image capture device. FIGS. 4E and 4F respectively show the part having a plane reflective surface (the fixture) tilts by angle α and the field of view of the image capture device. As shown in FIGS. 4C and 4E, the first virtual image I1 results from the reflected light beam R in turn resulting from the refraction of the incident light beam I by the part having a plane reflective surface 11. This allows for the first virtual image I1 can be associated with a virtual location in space, as well. It can been seen from FIGS. 4D and 4F, the first virtual image I1 shifts and keeps within the field of view FOV of the image capture device 12. It can be seen that by using the Laws of Geometrical Optics, the tilt angle γ measured by the apparatus according to the second embodiment can be calculated according to equations (1) and (2), as well.

As the apparatus can still work with regulation of the horizontal position of the part having a plane reflective surface with a narrower measurement range [0, β], it thereby is more flexible addressing different system configuration, in particular where some of its components need to occupy the space below the visible element.

The visible element 10 can be independent from the image capture device 12 as described by the first and second embodiments, or it can be a part of the image capture device 12. For example, the visible element 10 can be the shutter of the image capture device 12, which a pattern visibly distinguishable from its surrounding area.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. An apparatus for detecting tilt of a fixture, including:
a visible element having a pattern visibly distinguishable from a surrounding area from components in a field of view of the visible element;
a part having a plane reflective surface being configured to be engaged with the fixture in alignment and being arranged to reflect light beams propagating directly from the visible element so as to produce a first virtual image of the visible element;
an image capture device being disposed at a same side of the visible element with respective to the part having a plane reflective surface and being configured to have the field of view covering the first virtual image and a second virtual image of the visible element produced by the part having a plane reflective surface, wherein the second virtual image was produced where the part having a plane reflective surface assumed a levelling orientation; and
a controller being adapted for detecting tilt of the fixture using a deviation of the first virtual image from the second virtual image of the visible element in the field of view of the image capture device;
wherein an angle of the tilt of the fixture is calculated in consideration of a distance between the visible element and the part having a plane reflective surface and the deviation of the first virtual image from a second virtual image of the visible element.

2. The apparatus according to claim 1, wherein:
the visible element is a portion of the image capture device facing the part having a plane reflective surface.

3. The apparatus according to claim 2, further including:
a memory being configured for storing information concerning a location of the second virtual image of the visible element in the field of view of the image capture device.

4. The apparatus according to claim 2, wherein a lens of the image capture device and the visible element are disposed at substantially same distance from the part having a plane reflective surface where the fixture assumes the levelling orientation.

5. The apparatus according to claim 1, further including:
a memory being configured for storing information concerning a location of the second virtual image of the visible element in the field of view of the image capture device.

6. The apparatus according to claim 5, wherein a lens of the image capture device and the visible element are disposed at substantially same distance from the part having a plane reflective surface where the fixture assumes the levelling orientation.

7. The apparatus according to claim 1, wherein:
a lens of the image capture device and the visible element are disposed at substantially same distance from the part having a plane reflective surface where the fixture assumes the levelling orientation.

8. The apparatus according to claim 1, wherein:
a focal length of the image capture device is maintained twice as long as its distance to the part having a plane reflective surface assuming the levelling orientation.

9. A method for detecting tilt of a fixture, including:
a visible element projecting a pattern visibly distinguishable from a surrounding area;
reflecting light beams propagating directly from the visible element so as to produce a first virtual image of the visible element by a part having a plane reflective surface engaged with the fixture in alignment;
having a field of view of an image capture device to cover the first virtual image and a second virtual image of the visible element produced by the part having a plane reflective surface, wherein the second virtual image was produced where the part having a plane reflective surface assumed a levelling orientation; and
detecting tilt of the fixture using a deviation of the first virtual image from the second virtual image of the visible element in the field of view of the image capture device;
an angle of the tilt of the fixture is calculated in consideration of a distance between the visible element and the part having a plane reflective surface and the deviation of the first virtual image from a second virtual image of the visible element.

10. The method according to claim 9, wherein:
the visible element is a portion of the image capture device facing the part having a plane reflective surface.

11. The method according to claim 10, further including storing information concerning a location of the second virtual image of the visible element in the field of view of the image capture device.

12. The method according to claim 10, wherein a lens of the image capture device and the visible element are disposed at substantially same distance from the part having a plane reflective surface where the fixture assumes the levelling orientation.

13. The method according to claim 9, further including:
storing information concerning a location of the second virtual image of the visible element in the field of view of the image capture device.

14. The method according to claim 9, wherein:
a lens of the image capture device and the visible element are disposed at substantially same distance from the part having a plane reflective surface where the fixture assumes the levelling orientation.

15. The method according to claim 9, wherein:
a focal length of the image capture device is maintained twice as long as its distance to the part having a plane reflective surface assuming the levelling orientation.

* * * * *